Oct. 16, 1956  H. G. F. ROESSLER  2,766,966
WINCH FOR MOTOR VEHICLES
Filed April 16, 1952  3 Sheets-Sheet 1

Inventor
Heinrich G. F. Roessler
By Klicker and Padlow
Attorneys

Oct. 16, 1956 H. G. F. ROESSLER 2,766,966
WINCH FOR MOTOR VEHICLES
Filed April 16, 1952 3 Sheets-Sheet 2

Inventor
Heinrich G. F. Roessler
By Wicke and Padlon
Attorneys

Oct. 16, 1956     H. G. F. ROESSLER     2,766,966
WINCH FOR MOTOR VEHICLES
Filed April 16, 1952     3 Sheets—Sheet 3
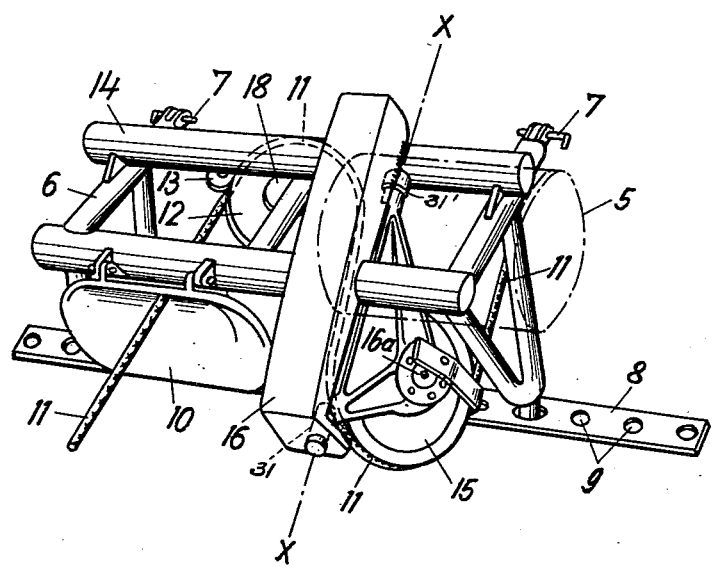
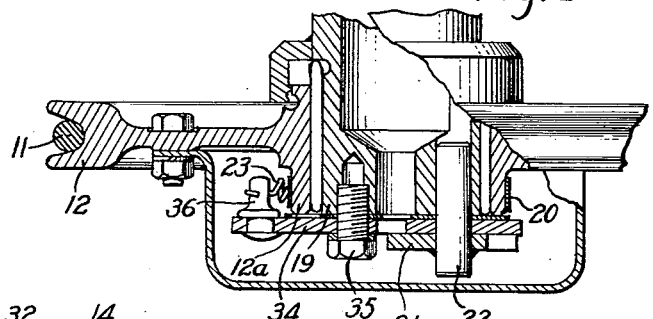
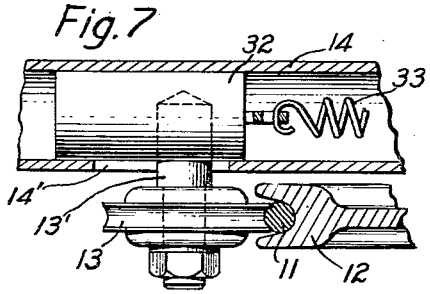
INVENTOR.
HEINRICH G. F. ROESSLER.
BY *Dicke and Padlon*
ATTORNEYS.

United States Patent Office 2,766,966
Patented Oct. 16, 1956

2,766,966
WINCH FOR MOTOR VEHICLES

Heinrich G. F. Roessler, Gaggenau, Baden, Germany, assignor to Daimler-Benz Aktiengesellschaft, Stuttgart-Unterturkheim, Germany Application April 16, 1952, Serial No. 282,611

Claims priority, application Germany April 18, 1951

9 Claims. (Cl. 254—166)

The present invention relates to winch for motor vehicles, and more particularly to a rope winch for motor vehicles which co-operates with a winding or reeling device.

Accordingly, it is an object of the present invention to provide an arrangement which facilitates the mounting and detaching of the winch and winding device, whereby the winch and winding device may be readily mounted and detached also by a single person without special technical knowledge in a quick manner.

A further object of the present invention is the provision of an inexpensive and simple arrangement of the entire drive or draw gear at a motor vehicle, especially also at a so-called "farm rail" which consists of a cross rail to which agricultural implements are attached, whereby such farm rail may be utilized for supporting of the draw gear.

Further objects of the present invention relate to the drive arrangement of the winding device, and more particularly to a special mechanism for keeping the rope taut and other details thereof.

An essential characteristic of the present invention consists in the fact that the winding device, which co-operates with the winch, is formed as an independent, integral unit.

A further characteristic of the present invention lies in the provision of quickly detachable coupling means for each of the winch and the winding device so that the winch and winding device may be attached and detached quickly and independently from each other. The coupling means may consist, for example, of removable plugs, plug journals or pegs.

According to another feature of the present invention the winch may be fastened directly on the frame, while the winding device is supported on a special supporting frame, which, for example, may also be fastened on top thereof on the vehicle frame and which supports itself at the bottom thereof on a "farm" rail which may be detachably mounted on the vehicle frame or on the winch underframe.

Further objects and features of the present invention will become more obvious from the following description when taken in connection with the accompanying drawing which shows for purposes of illustration only one preferred embodiment of the present invention, and wherein:

Figure 5 is a perspective view of a portion of Figure 1 illustrating the winding device of the winch in accordance with the present invention.

Figure 4:
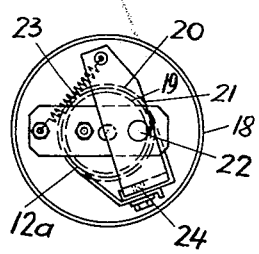
Figure 4 is a bottom view of a recoil brake used in the winding device of the winch shown in Figure 1 in accordance with the present invention, on a larger scale.

Figure 7 is a partial sectional view taken in an essentially vertical plane through the spar 14 and the axes of the reversing roll 12 and the counter-roll 13, and Figure 8 is a cross sectional view through the axes of the reversing roll showing in detail the brake mechanism of Figure 4.

Figure 1:
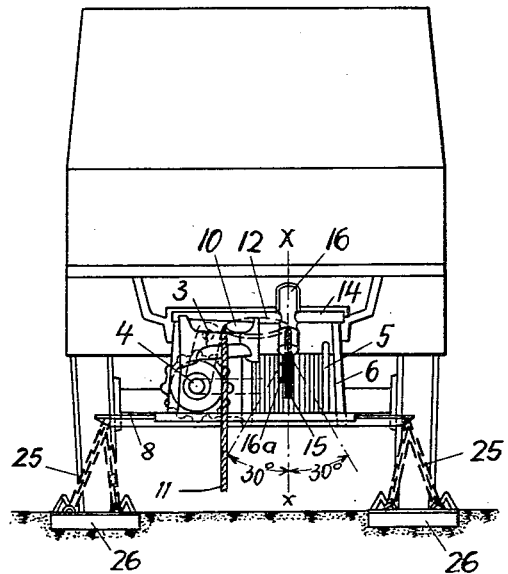
Figure 1 is a rear view of a four-wheel tractor provided with a winch in accordance with the present invention.
Figure 2:
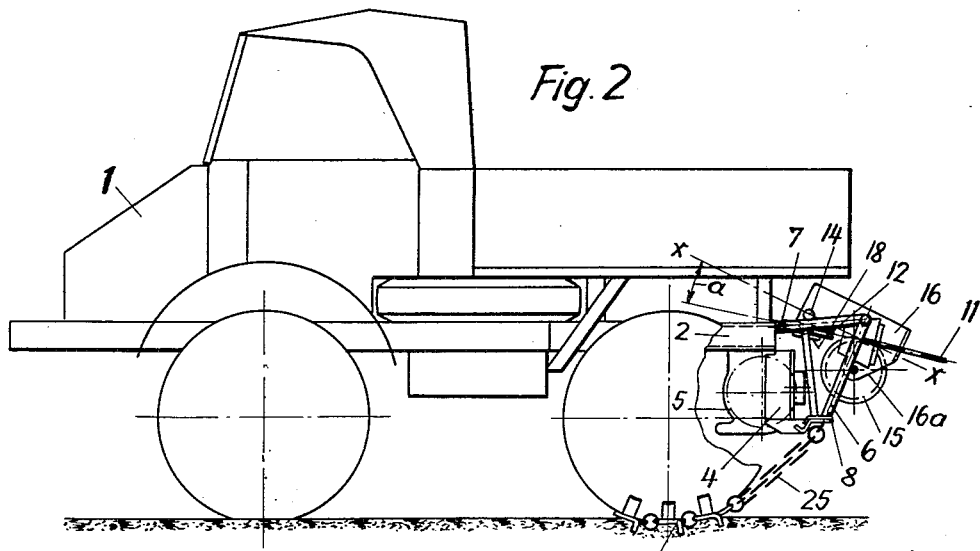
Figure 2 is a side view of Figure 1.
Figure 3:
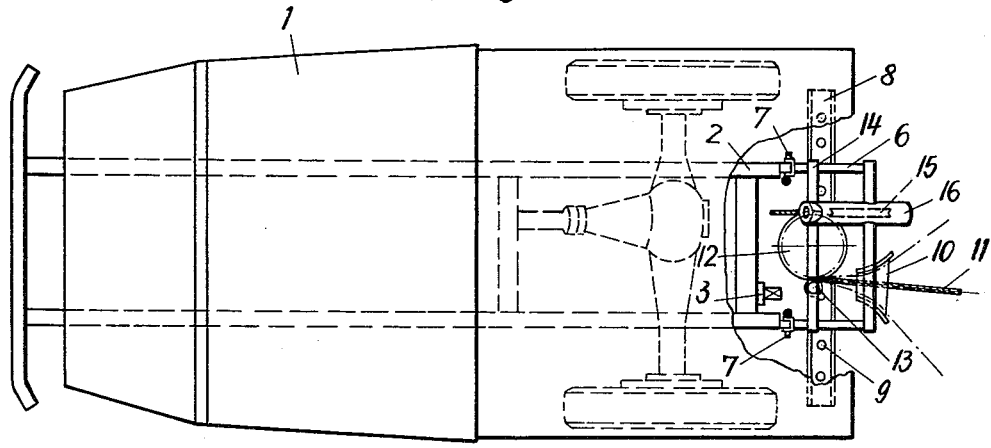
Figure 3 is a top plan view with parts broken away of Figure 2.
Figure 6:
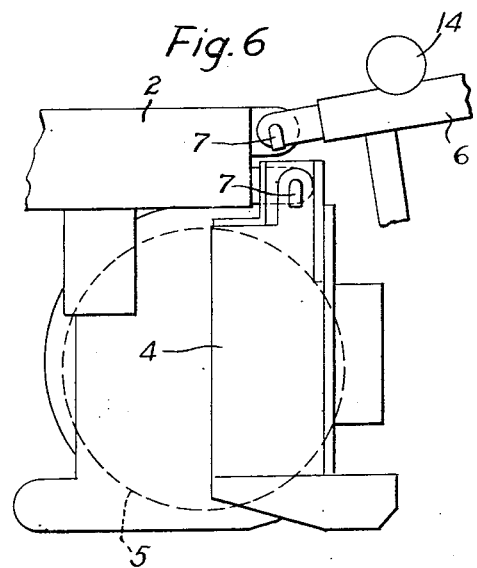
Figure 6 is a partial side view similar to Figure 2 showing various details of an enlarged scale.

Referring now more particularly to the drawing wherein like reference numerals are used throughout the various views to designate like parts, reference numeral 1 designates a four-wheeled tractor which serves as motor-driven vehicle. The winch in accordance with the present invention is fastened to the rear end of the frame 2 (Figure 2). The drive of the winch is effected through a shaft journal 3 (Figures 1 and 3) which is driven from the vehicle motor in any suitable manner (not illustrated herein). The shaft journal 3 drives the cable drum 5 through a transmission 4 of conventional construction for driving the cable drum 5. The frame for the cable drum and of the transmission casing 4, which may be built together with the cable drum, are connected with the frame 2 of the tractor 1 by means of a quickly detachable connection 7 (Figures 5 and 6), especially by means of plugs, plug journals or pegs as illustrated in Figure 6 in which the transmission 4 as well as the supporting frame 6 are secured to the frame 2 by means of plug journals 7. The drive of the winch is formed in such a manner that it is only necessary to place the same over the motor driven journal 3. However, it is understood that the quickly detachable connection is not limited thereto but any other quickly detachable connection may be used herein.

A winding device which is constructed as an integral unit is mounted ahead of the cable drum and its drive arrangement. The winding device consists of a truss-like supporting frame 6 which is fastened on top thereof by means of plug journals 7 to the vehicle frame 2 (Figure 6), and which rests at the bottom thereof on the cross rail 8, which may be so-called "farm" rail since it may also serve for purposes of attaching agricultural implements thereto. The farm rail 8 is provided with a plurality of holes 9 (Figure 3), and thereby serves in a particularly advantageous manner for the attachment of agricultural implements or appliances. The supporting frame 6 is provided at the bottom thereof with plugs or plug journals which extend downwardly into the holes 9 of the rail 8.

The supporting frame is further provided with a funnel-shaped inlet mouth 10 for guiding the rope 11. Behind the inlet mouth 10, the rope passes over a reversing roll or device 12. The reversing roll 12 is provided with a rope groove into which the rope is pressed by means of a counter-roll 13 which is spring-loaded. The counter-roll 13 is journalled in a slide member 32 which slides within the transverse spar 14 and is constantly urged toward the right by a spring 33 thereby forcing the counter-roll 13 into engagement with the rope 11 in such a way that the rope 11 is pressed into the groove of the reversing roll 12. The pressure roll 13 is rotatably journalled in the slide member 32 by means of a bearing pin 13' which extends through an appropriate opening 14' in the transverse spar 14 to enable sliding movement of the pressure or counter-roll assembly consisting of the sliding member 32, the bearing pin 13' and the roll 13, properly speaking. After leaving the reversing roll, the rope 11 passes over a swivel roll 15 from the top thereof, and from there proceeds again in an upwardly direction on the cable drum 5. The cable drum 5 is provided with a thread which is cut into the drum surface and which is of such cross section as to accommodate the rope and guide the same as well as the swivel roll during the winding operation. With successive layers rope turn will follow adjoining rope turn by reason of the free movability of the swivel roll. The swivel roll is sluable from its vertical center position toward both sides by an angle of 30 degrees each, and is sluable about an axis $x$—$x$ (Figures 1 and 5) of a bearing tube 16 which is arranged thereabove. For that purpose, two bearing eyes 31 and 31' (Figure 5) are provided at the underside of the bearing tube 16 at each end thereof. The pivots of the swivel bearing 16a (Figures 1, 2 and 5) are supported in these bearing eyes 31 and 31'. Theoretically the rope portion which passes over the swivel roll 15 after leaving the reverse roll 12, should pass over the swivel roll exactly in the direction of the swivel axis $x$—$x$. As this would involve a complicated construction for the bearings of the swivel roll, it suffices to maintain the angle $\alpha$ between this rope portion and the swivel axis as small as possible (Figure 2). For reasons of balance the axis $x$—$x$ should be located approximately parallel to the direction of the course of the rope during winding of the rope on the center of the cable drum.

If the rope is unloaded, i. e., if the rope is not stretched or kept taut, it is necessary for purposes of neat winding that the rope be wound onto the cable drum with a certain minimum amount of tension. For that purpose, provision is made for a recoil brake at the reversing wheel 12 as illustrated in Figure 4. The recoil brake may, for example, be housed in a hub casing 18 of the reversing roll 12 (Figures 2 and 4).

As shown in Figures 4 and 8 a brake strap or band 20 may run, for example, over the hub 12a or a hub drum of the reversing roll 12 which rotates around a fixed journal 19. The brake band 20, which is formed as an endless band, is fastened at one end thereof to the end of a double-armed lever 21, which is pivotally supported intermediate its two ends on a journal 22 mounted into the fixed journal 19 (Figure 8). The brake band 20 is also affected by a tension spring 23 which engages the other end of the lever 21. The spring 23 is fixedly secured in any conventional manner to the stationary support member 34 as, for example, by being hooked over the pin 36 secured at one end thereof (Figure 8). The support member 34 is secured to the journal 19 by means of bolt 35 which together with journal 22 prevents rotation of the support member 34 relative to the journal 19.

Figure 4 illustrates the brake arrangement of Figure 2 as viewed from below. If the portion of the rope 11 which is in front of the inlet mouth 10 is slackened, then the portion of the rope between the cable drum 5 and the reversing roll 12 will also tend to slacken and thereby endeavors to rotate the reversing roll in a clockwise direction as viewed in Figure 3, which corresponds to a rotation in the counter-clockwise direction as viewed in Figure 4. The friction, which will occur between the brake band 20 and the roll hub 12a, would tend to move the brake band in the same direction, which in turn would endeavor to move the double-armed lever also in a counter-clockwise direction, as viewed in Figure 4. Any attempt to move the double-armed lever 21 in a counter-clockwise direction would only result in tightening the brake band under the influence of an upward leverage action, and by reason of the fact that the securing point 24 of the brake band would move away a greater distance from the axis of rotation of the reversing roll 12. However, the rope is only kept as taut as is necessary to prevent slackening of the rope portion between the reversing roll 12 and the cable drum 5 and to thereby prevent that it falls off the reversing roll 12 and the swivel roll 15 or that consecutive rope turns run above each other on the brake drum. However, the winding operation of the rope onto the brake or cable drum is not impeded thereby.

Contrary thereto, with rotation of the reversing roll in the opposite direction the brake is released when the rope is unwound from the cable drum 5, i. e., is drawn out of the inlet mouth 10.

The counter-roll 13 is operative to prevent sliding of the rope in the groove provided in the reversing wheel 12 which may be thus braked.

During the winding operation the reversing wheel is thus rotated by the rope and the reversing wheel 12 is subjected to a braking action by the above-described braking arrangement. It results therefrom that in case the incoming rope is unloaded and thereby not taut, nevertheless the rope leaves the reversing wheel with a certain amount of minimum tension which is adequate for neat winding of the rope on the rope winch. During unwinding operation of the rope from the winch the brake linings in the cylindrical rolls turn together with the reversing wheel 12 so that no braking action takes place.

The winch supporting frame and the winding device form relatively lightweight construction units which may be attached to any motor vehicle with few manipulations in a quick manner by inserting the downwardly extending plug journals of supporting frame 6 into the holes 9 of rail 8 (Figure 5) and by securing the top of frame 6 to the frame 2 of the vehicle by means of detachable plug journals 7, and which may also be similarly detached therefrom by following the reverse procedure.

The supporting frame 6 or the cross "farm" rail 8 which projects further laterally, may simultaneously serve the attachment of chains 25 of the anchoring device, which, for example, may include anchoring chains 26 or any other suitable non-skid equipment, in order to prevent movement of the vehicle from its predetermined emplacement position while the rope 11 is under tension.

A tractor which is equipped in this manner, especially a four-wheeled driven tractor is particularly suitable for purposes of forest clearing, as an auxiliary equipment for bridge construction, for the erection of large tents, of high masts, etc.

What I claim is:

1. In a motor vehicle provided with a main frame and an auxiliary frame located at the rear end of the vehicle, the auxiliary frame serving also for purposes of attaching agricultural implements thereto, a first unitary structure including a winch device and driving means for said winch device, quickly detachable connecting means for detachably connecting said first unitary structure to the rear end of said vehicle frame, a second unitary structure including a winding device and a supporting frame, and quickly detachable connecting means for detachably connecting said second unitary structure to the rear end of said vehicle frame independently of said first unitary structure, said second unitary structure being located behind said first unitary structure.

2. In a motor vehicle, the combination according to claim 1, wherein said winding device includes an inlet funnel, a direction-reversing device and a swivel roll for said rope.

3. In a motor vehicle the combination according to claim 2 wherein said winch includes a drum, and further including means for keeping the rope portion between said reversing device and said drum under minimum tension.

4. In a motor vehicle with a vehicle frame and a transversely disposed farm rail at the rear of the vehicle, a first unitary structure including a winch device, driving means for said winch device and first frame means for supporting said winch device and driving means, said winch device, said driving means and said first frame means being connected together into said first unitary structure, quickly detachable means for mounting said first unitary structure on the rear end of the vehicle frame including means for connecting said first frame means to the vehicle frame, a second unitary structure forming a winding device and including an inlet funnel for the rope, reversing means for said rope, a swivel roll angularly displaced with respect to said reversing means, said rope resting on said swivel roll after passing over said reversing means, sluing means for said swivel roll to enable said swivel roll to follow the cross-shifting movement of the rope during winding and unwinding thereof on said winch device, and second frame means for said winding device, said winding device and said second frame means being connected together into said second unitary structure, and quickly detachable means for mounting said second frame means on said farm rail rearwardly of said first unitary structure and for connecting said second frame means to said vehicle frame.

5. In a motor vehicle the combination according to claim 4 wherein said farm rail is provided with a series of holes and wherein said second frame means includes leg portions extending through at least some of said holes, said second-mentioned quickly detachable means including removable plugs.

6. In a motor vehicle the combination according to claim 4 wherein said sluing means enables sluing movement of said swivel roll from its vertical center position to both sides about an axis approaching approximately tangentially said reversing means.

7. In a motor vehicle the combination according to claim 4 wherein said second unitary structure further comprises a pressure counter-roll adjacent said reversing means and cooperating therewith to wedgably guide said rope, said counter-roll being supported on said second frame means.

8. In a motor vehicle the combination according to claim 4, further comprising a one-way braking device secured to said reversing means including means for preventing slackening of the rope portion intermediate said reversing means and said winch device.

9. In a motor vehicle the combination according to claim 8 wherein said one-way braking device is an automatically operated recoil brake mounted on said second unitary structure.

References Cited in the file of this patent

UNITED STATES PATENTS

| | | |
|---|---|---|
| 670,967 | Powers | Apr. 2, 1901 |
| 2,178,280 | Hutchins et al. | Oct. 31, 1939 |
| 2,180,987 | Larsen et al. | Nov. 21, 1939 |
| 2,286,547 | Hutchins | June 16, 1942 |
| 2,321,905 | French | June 15, 1943 |
| 2,344,417 | Schmidt et al. | Mar. 14, 1944 |
| 2,473,628 | Allison | June 21, 1949 |
| 2,501,837 | Benner | Mar. 28, 1950 |
| 2,558,254 | Johnson | June 26, 1951 |
| 2,662,732 | Allenbaugh | Dec. 15, 1953 |